United States Patent

Asano

[15] 3,653,854
[45] Apr. 4, 1972

[54] DIGITALLY CONTROLLED GRINDING MACHINES

[72] Inventor: Kiroaki Asano, Kariya, Japan

[73] Assignee: Toyoda Koki Kabushiki Kaisha, Aichi-ken, Japan

[22] Filed: Sept. 22, 1970

[21] Appl. No.: 74,315

[30] Foreign Application Priority Data

Sept. 29, 1969 Japan....................................44/77652

[52] U.S. Cl. .........................................................51/165 TP
[51] Int. Cl.............................................................B24b 51/00
[58] Field of Search.................................51/105 SP, 165 TP

[56] References Cited

UNITED STATES PATENTS 3,344,559  10/1967  Inaba.................................51/165 TP X
2,270,206  1/1942  Flygare...............................51/105 SP Primary Examiner—Harold D. Whitehead
Attorney—Wenderoth, Lind & Ponack

[57] ABSTRACT

In a digitally controlled grinding machine for working a workpiece including at least one cylindrical portion and at least one tapered portion, there are provided a first grinding wheel supported on a first grinding wheel carriage for working the cylindrical portion and a second grinding wheel supported on a second grinding wheel carriage for working the tapered portion. When the tapered portion of the workpiece is to be ground, a work table for supporting the workpiece and the second carriage are fed in directions perpendicular with each other. The work table and the first and second grinding wheel carriage, are operated by servo-motors responsive to digital command signals prepared by informations stored in a memory.

7 Claims, 8 Drawing Figures

Patented April 4, 1972

HIROAKI ASANO,
INVENTOR.

BY Wenderoth, Lind & Ponack
ATTORNEYS

HIROAKI ASANO,
INVENTOR.

BY Wenderoth Lind Ponack
ATTORNEYS

Patented April 4, 1972

HIROAKI ASANO,
INVENTOR.

BY Wenderoth, Lind & Ponack
ATTORNEYS

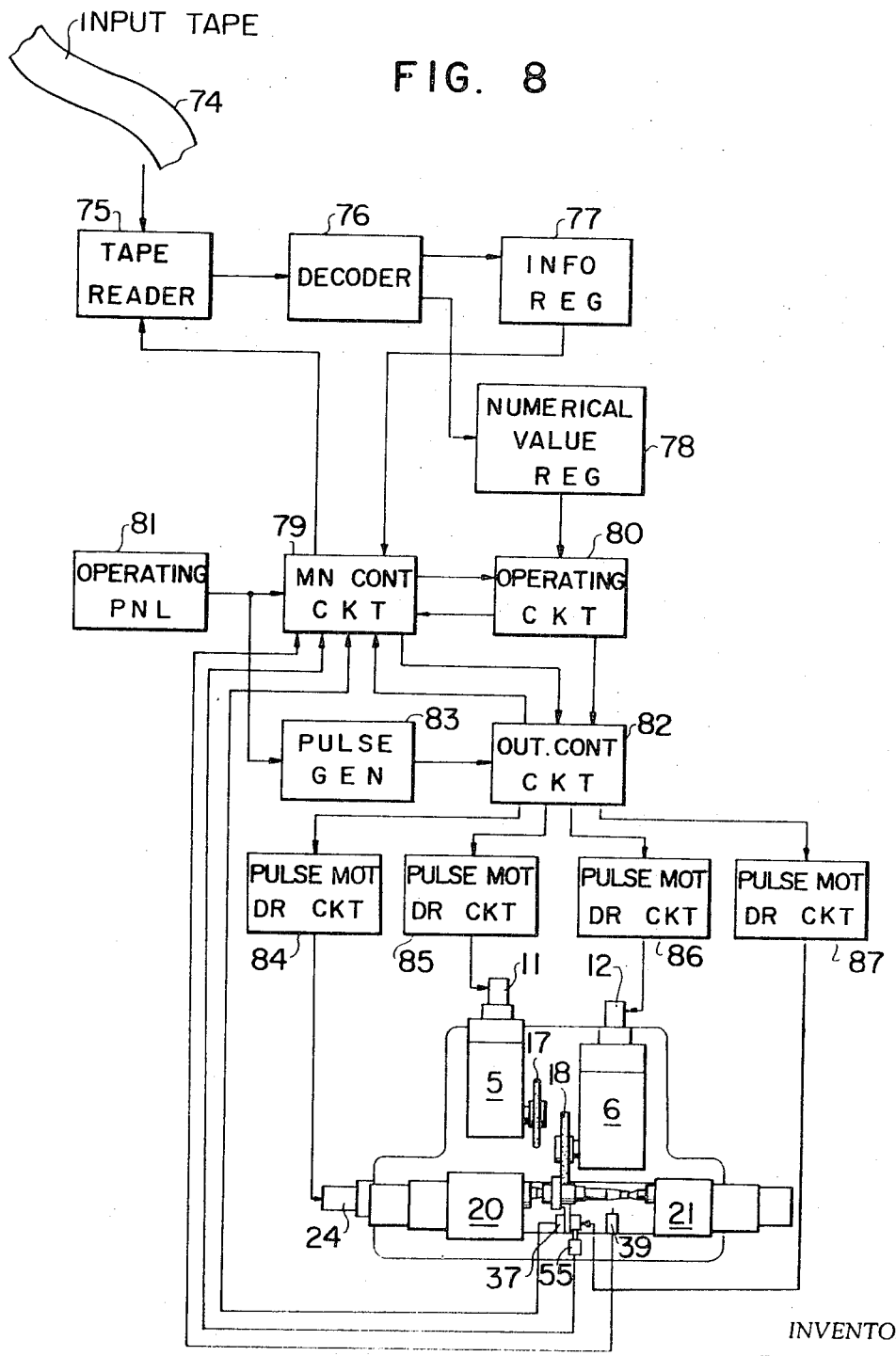

DIGITALLY CONTROLLED GRINDING MACHINES

BACKGROUND OF THE INVENTION

This invention relates to a digitally controlled grinding machine wherein the movements of grinding wheel carriages, a work table and other component parts of the machine are controlled in accordance with given digital data to work a workpiece including at least one cylindrical portion and at least one tapered portion to the desired dimensions and configurations.

As is well known in the art, when it is required to work a workpiece including a cylindrical portion and a tapered portion by means of a grinding machine, in order to accurately align centers of the cylindrical portion and of the tapered portion, it is highly desirable not to dismount the workpiece from the grinding machine after the workpiece has once been mounted between the head stock center and the tail stock center of the machine. For this reason, when a workpiece including a tapered portion is to be ground, it has been the practice to first grind the cylindrical portion and then grind the tapered portion by swinging the work table or the grinding wheel carriage. However, such a method of working wherein the work table or the grinding wheel carriage is swung for each grinding operation of the tapered portion requires much labour and time for the proper adjustment of the angle of swinging the work table and the like. Further, it is also extremely difficult to correctly restore the work table, etc. to the original position thus resulting in the difficulties in producing the tapered portion and the cylindrical portion with high accuracies.

When one tries to automatically perform all grinding operations by a digital control, the most important problem is involved in the grinding operation for the tapered portion. More particularly, when the tapered portion is ground by the afore mentioned swinging motion of the work table or grinding wheel carriage, there are many problems such as the correction of the position of the grinding wheel carriage resulted from the variations in the grinding wheel diameter, flexure of the work table or inaccuracy of the restoration of the table to the original position and so forth. These problems make it almost impossible to accurately work the tapered portion with a digitally controlled grinding machine.

SUMMARY OF THE INVENTION

It is therefore a principal object of this invention to provide a novel digitally controlled grinding machine capable of working at high accuracies a workpiece including at least one cylindrical portion and at least one tapered portion without the necessity of swinging the work table or the grinding wheel carriage when the tapered portion is to be ground.

Another object of this invention is to provide a novel digitally controlled grinding machine including a digital control system which can automatically and continuously work the tapered and cylindrical portions of the workpiece.

Still another object of this invention is to provide a novel digitally controlled grinding machine including improved mechanisms for measuring definite dimensions of the finished workpiece.

According to this invention, in a digitally controlled grinding machine for grinding a workpiece including at least one cylindrical portion and at least one tapered portion and comprising a slidable work table, table feed means and means to support the workpiece on the work table, there are provided a first grinding wheel carriage for supporting a first grinding wheel adapted to work the cylindrical portion, first feed means to move the first grinding wheel carriage, a second grinding wheel adapted to work the tapered portion, a slidable second grinding wheel carriage supporting the second grinding wheel, second feed means to move the second grinding wheel carriage in a direction perpendicular to the direction of movement of the work table, a plurality of servo-motors responsive to command signals for respectively operating the table feed means and the feed means for first and second grinding wheel carriages, and a digital control system for the servo-motors including a memory for storing informations regarding workings of the cylindrical and tapered portions of the workpiece and a control circuit responsive to the stored informations to operate the feed means of the first grinding wheel carriage for working the cylindrical portion and to simultaneously operate, at a definite speed ratio, the table feed means and the second feed means for the second grinding wheel carriage for working the tapered portion.

BRIEF DESCRIPTION OF THE DRAWINGS

In the accompanying drawings:

FIG. 8 shows a block diagram of a digital control system and a diagrammatic plan view of the grinding machine.

DESCRIPTION OF THE PREFERRED EMBODIMENT

Figure 1:
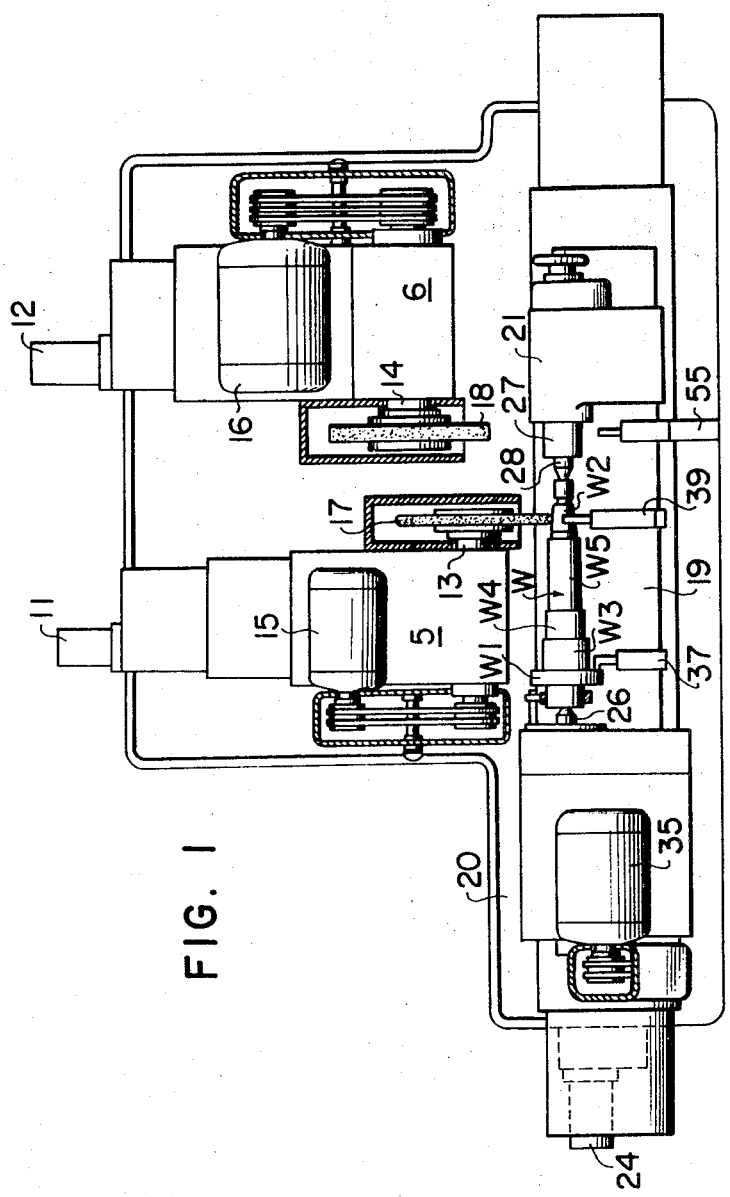
FIG. 1 is a plan view of a digitally controlled grinding machine embodying this invention.

With reference now to FIG. 1 to 4 of the accompanying drawings, the grinding machine is provided with a base 1, a table slide surface 2 on its fore upper surface and two spaced apart parallel auxiliary slide surfaces 101 and 102 extending in a direction perpendicular slide surface 2 and on the rear upper surface of the base 1. Slide blocks 103 and 104 are slidably mounted on slide surfaces 101 and 102, respectively. Nuts 105 and 106 are secured to the lower surfaces of slide blocks 103 and 104, respectively, to threadedly engage feed screws 107 and 108, respectively, which are rotatably supported in the grinding machine base 1. These feed screws are driven by intermittent feed mechanisms, respectively, constructed by rack-pinion mechanisms 109 and 110 connected to hydraulic driving means (not shown) and by ratchet mechanisms 111 and 112, respectively, whereby slide blocks 103 and 104 are intermittently fed a definite distance.

On the upper surface of respective slide blocks 103 and 104 are formed grinding wheel carriage slide surfaces 3 and 4 extending in the direction parallel to the movement of the slide blocks 103 and 104. Two grinding wheel carriages 5 and 6 for different grinding operations, as described later in detail, are slidably mounted on slide surfaces 3 and 4, respectively. Nuts 7 and 8 are secured to the lower surfaces of grinding wheel carriages 5 and 6, respectively, to threadedly engage feed screws 9 and 10, respectively, which are rotatably journalled in slide blocks 103 and 104, respectively. Feed screws 9 and 10 are connected to electro-hydraulic pulse motors 11 and 12, respectively, to slidably move grinding wheel carriages 5 and 6 at rapid and slow feed speeds. Grinding wheel shafts 13 and 14 are rotatably supported by grinding wheel carriages 5 and 6, respectively, and are driven by electric motors 15 and 16, respectively mounted on these carriages. A grinding wheel 17 having a round peripheral edge for working the tapered portion is mounted on one end of shaft 13 while another grinding wheel 18 for working the cylindrical portion and having a square peripheral edge is mounted on one end of shaft 14.

Figure 2:
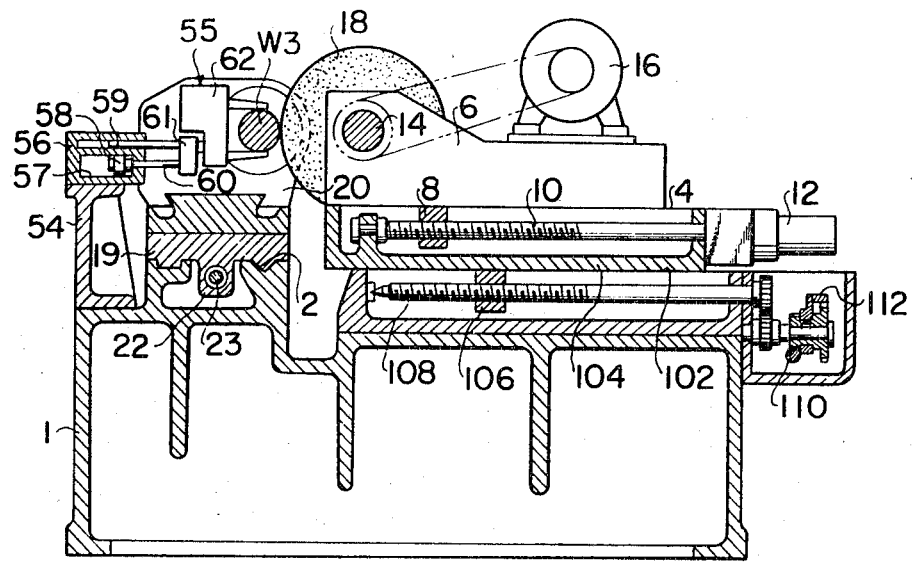
FIG. 2 shows a transverse section of the machine shown in FIG. 1 showing a mechanism for grinding the cylindrical portion by using one grinding wheel.
Figure 3:
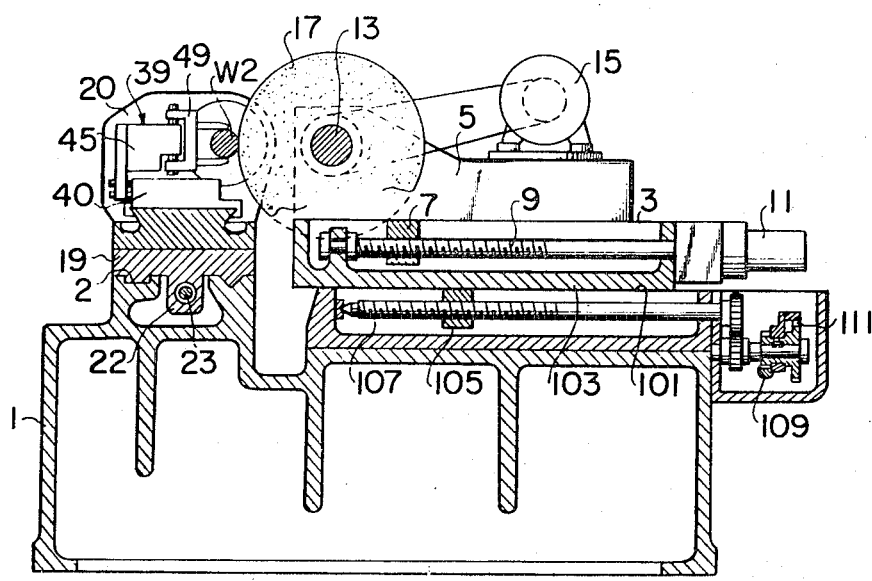
FIG. 3 shows a similar transverse section showing a mechanism for grinding the tapered portion by using another grinding wheel.

As shown in FIGS. 2 and 3, a work table 19 is slidably mounted on the table slide surface 2 and a head stock 20 and a tail stock 21 are secured on work table 19 with a definite spacing there between A nut 22 is secured to the lower surface of work table 19 to threadedly receive a feed screw 23 rotatably journalled in the grinding machine base 1. The feed screw 23 is connected to an electro-hydraulic pulse motor 24 to drive table 19 in a direction perpendicular to the sliding direction of respective grinding wheel carriages 5 and 6 thus positioning work table 19 at a desired position. A sleeve 25 carrying at one end a head stock center 26 is received in the head stock 20 to be slidable in the axial direction alone. Center 26 cooperates with a tail stock center 28 secured to one end of a ram 27, which in turn is slidably received in the tail stock 21 to support a workpiece W. A feed screw 29 rotatably supported by the head stock 20 is threaded in the rear end of sleeve 25. The feed screw 29 is driven by a hydraulic driving mechanism, constructed by a cylinder 30 and a piston 31, through a rack-pinion mechanism 32 and 33 to slide supporting sleeve 25. Further, a driving pulley 34 is rotatably mounted on the head stock 20 to be driven by an electric motor 35 through a suitable driving connection. The driving pulley 34 is connected to the workpiece W through a driving pin 36 to drive the workpiece.

Figure 4:
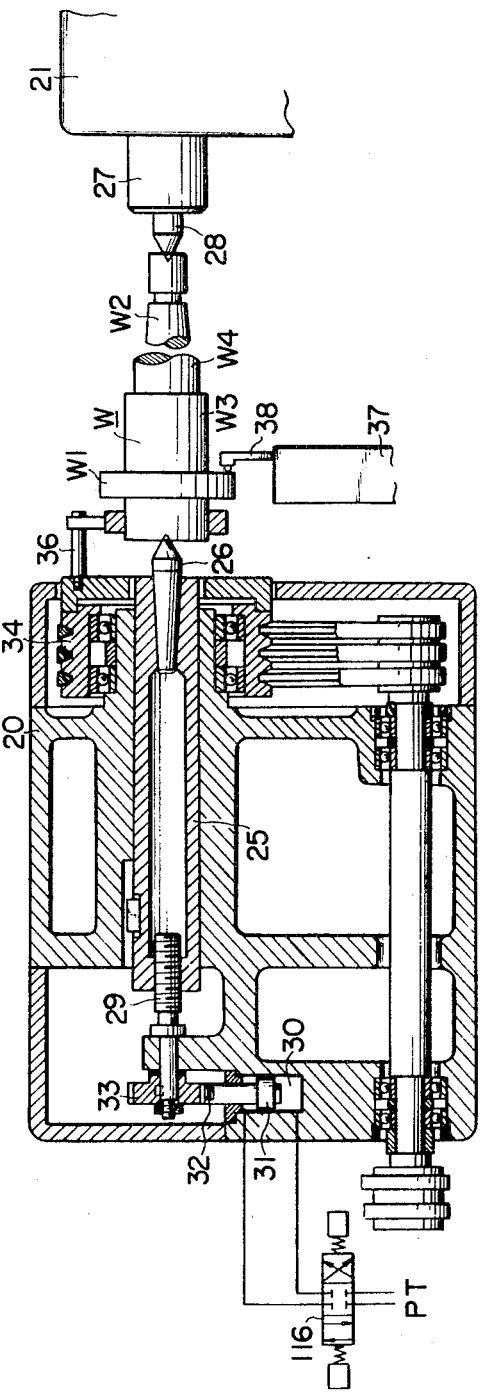
FIG. 4 is a plan view, partly in longitudinal section, of the head stock.

As shown in FIG. 4, an end surface measuring device 37 for positioning the workpiece W in the axial direction is mounted on work table 19. The end surface measuring device 37 has a measuring probe 38 which is arranged to be engaged and displaced in the axial direction by the flange W1 of the workpiece W thus closing a contact of an electric switch, not shown, when the probe is displaced a predetermined distance. This will stop the axial movement of the workpiece W, thus positioning the same at the desired position on work table 19, as will be described later.

Figure 6:
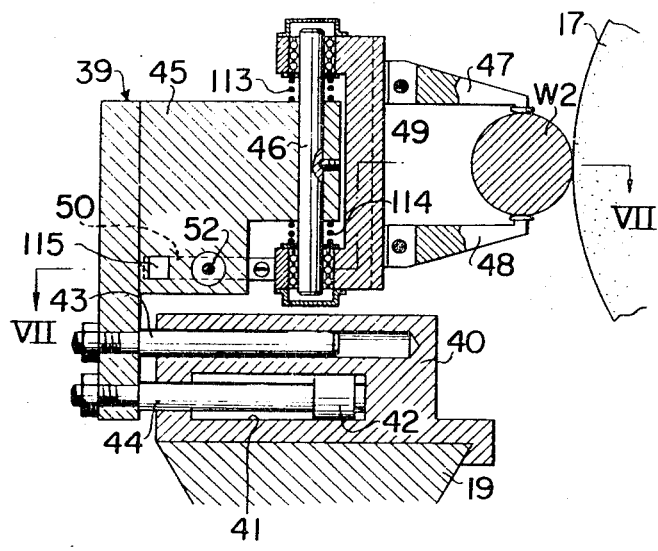
FIG. 6 is a longitudinal sectional view of a mechanism for finishing the tapered portion to a definite dimension.
Figure 7:
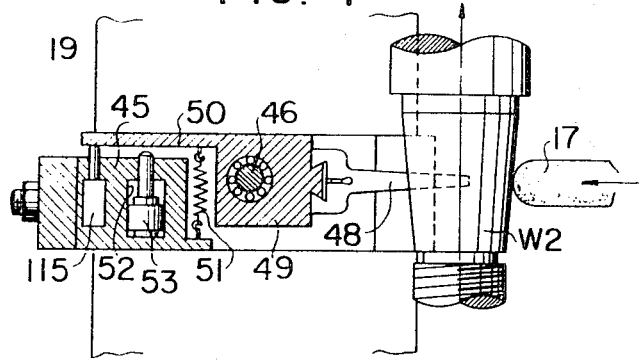
FIG. 7 shows a section taken along a line VII—VII in FIG. 6.

Further a mechanism 39 for finishing the tapered portion to a definite dimension by measuring the diameter of the tapered portion W2 of the workpiece W is mounted on work table 19. With reference now to FIG. 6 and 7, the detailed construction of mechanism 39 will be described hereunder. A cylinder 41 slidably receiving a piston 42 is formed in a base 40 secured on work table 19. Further, a pilot bar 43 is slidably received in base 40 in parallel with piston 42, the outer ends of the piston rod 44 of piston 42 and pilot bar 43 being connected to a supporting block 45. A vertical shaft 46 extends through an opening in supporting block 45 and an arm 49 is rotatably mounted on the upper and lower ends of vertical shaft 46. A pair of opposing probes 47 and 48 are adjustably secured to arm 49 to engage the tapered portion W2 of the workpiece W. Springs 113 and 114 are interposed between respective ends of the arm 49 and the upper and lower surfaces of the supporting block 45 to resiliently support arm 49 to be movable in the vertical direction. Arm 49 is provided with an integral projecting lever 50 to oppose one side of the supporting block 45, and the arm 49 is normally biased in the counterclockwise direction as viewed in FIG. 7 about the shaft 46 by means of a tension spring 51 connected between arm 49 and supporting block 45. A differential transformer 115 for measuring the diameter of the tapered portion is received in the block 49 to be acted upon by the outer end of lever 50. Differential transformer 115 is disposed to produce a voltage proportional to the angle of rotation of the supporting block 45, thus producing a signal representing the definite diameter of the tapered portion at a predetermined level of the output voltage. Further, block 45 contains a hydraulic driving mechanism comprising a cylinder 52 and a piston 53 and functions to rotate lever 50 in the clockwise direction against the force of tension spring 51.

When measuring mechanism 39 is advanced by cylinder 41, to measure the diameter of the tapered portion W2 of the workpiece W, piston 53 is operated to rotate arm 49 in the clockwise direction against the force of spring 51. Then piston 53 is operated in the opposite direction to rotate arm 49 in the opposite direction by spring 51 until probes 47 and 48 come to engage tapered portion W2. As the diameter of the tapered portion W2 decreases by being worked by grinding wheel 17, pair of probes 47 and 48 move to follow this decrease in the diameter so that arm 49 is further rotated about shaft 46 to control differential transformer 115 thus producing a signal representing the definite size or diameter. Before retracting the measuring mechanism 39, piston 53 is operated to rotate arm 49 clockwise to disengage probes 47 and 48 from the tapered portion.

Figure 5:
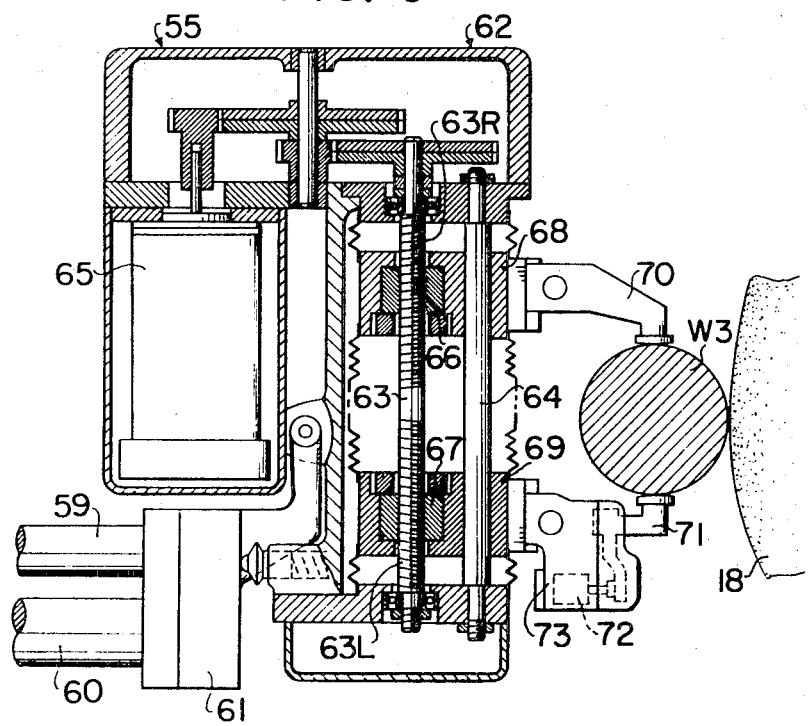
FIG. 5 is a longitudinal sectional view of a mechanism for finishing the workpiece to a definite dimension which is variable over a wide range.

A measuring device 55 for measuring finished diameters of various cylindrical portions W3, W4 and W5 of the workpiece W is mounted on a bracket 54 secured on the front surface of base 1. A preferred form of the measuring device 55 suitable for use in this invention will be described with reference to FIGS. 2 and 5. A block 56 fixedly secured on bracket 54 is formed with a cylinder 57 in which a piston 58 is slidably received. Block 56 slidably receives a pilot bar 59 which is parallel with piston 58, the outer ends of pilot bar 59 and the piston rod 60 of piston 59 being connected to a cross-bar 61. Pivotally mounted on cross-bar 61 is a measuring head 62 including a feed rod 63 and a pilot bar 64 which are disposed in parallel therewith. Feed rod 63 has right hand threads 63R and left hand threads 63L and the upper end of rod 63 is connected to an electric pulse motor 65 fixed to the measuring head, through a suitable gearing. The right hand threads 63R and left hand threads 63L of feed rod 63 receive nuts 66 and 67, respectively, which are contained in holders 68 and 69 respectively, which, in turn, are guided by pilot bar 64 to be moved in the opposite directions by the rotation of feed rod 63. A measuring probe 70 is adjustably mounted on the upper holder 68, while a block 73 pivotally mounting another probe 71 and including a built-in differential transformer 72, to detect the displacement of the pivotal probe 71, is adjustably mounted on the lower holder 69. The differential transformer 72 generates an output voltage proportional to the pivotal displacement of probe 71 thus providing a signal representing a definite dimension at a predetermined level of the output voltage.

When predetermined command pulses are applied to electric pulse motor 65, the probes 70 and 71 are moved vertically by a definite distance to vary the reference diameter or dimension. For this reason, it is possible to detect definite dimensions of a plurality of cylindrical portions W3, W4 and W5 by means of a single measuring mechanism 55.

As shown in FIG. 8, the control system of this invention comprises an input tape 74 storing numerical values or other data, a tape reader 75 to read informations stored in the input tape 74, a decorder 76 to descriminate the numerical values and other data, an information register 77 to store the output from the decorder and a numerical value register 78 also storing the out put from the decorder. There is also provided a main control circuit 79 which controls an output control circuit 82 in response to the data supplied by the input tape, and command signals from an operation circuit 80 and a control panel 81. The output control circuit 82 operates to control the application of the output pulses from a pulse generator 83 to succeeding pulse motor driving circuits 84, 85, 86, and 87, the outputs thereof being supplied to abovementioned electro-hydraulic pulse motors 11, 12, and 24 and to electric pulse motor 65, respectively, to cause these motors to rotate one step for each pulse received. The electro-hydraulic pulse motors 11 and 12 are used to move grinding wheel carriages 5 and 6, respectively. Their feed speeds are controlled in accordance with the frequencies of the applied pulses and their feed quantities are controlled in accordance with the number of applied pulses. The electro-hydraulic pulse motro 24 is employed to traverse work table 19, the feed speed thereof being controlled in accordance with the frequencies of the applied pulses whereas the feed quantity thereof being controlled in accordance with the number of the pulses supplied thus positioning the work table. The electric pulse motor 65 operates to vary the operating point of the wide range dimension measuring mechanism 55 in accordance with command signals from the tape 74. The wide range dimension measuring mechanism 55 provides command signals for predetermined dimensions or diameters of respective cylindrical portions W3, W4 and W5 of the workpiece during the grinding operation. These command signals are applied to the main control circuit 79 to control the electro-hydraulic pulse motors 12 and 24 thus effecting the feeding and stopping of the grinding wheel carriage 6 and work table 19.

The mechanism 39 for measuring the definite dimension of the tapered portion W2 provides a command signal regarding the dimension thereof during the grinding operation. This command signal is supplied to the main control circuit 79 to move the grinding wheel carriage 5 and work table 19 through electro-hydraulic pulse motors 11 and 24. The output signal from the end surface measuring device 37 is applied to the main control circuit 79 to actuate a switch valve 116 to control the supply of the pressurized oil to and from the cylinder 30 thus determining the axial position of the workpiece W. The purpose of such a positioning operation is to compensate for the variation in the position of the reference surface of the workpiece caused by variations in the size or shape of the center holes of the workpieces.

The operation of the novel digitally controlled grinding machine is as follows:

It is herein assumed that portions to be ground of the workpiece are the side surface of the flange W1, cylindrical portions W3, W4 and W5, and tapered portion W2 and that cylindrical portions W3, W4 and W5 are worked by transverse grinding operations. After the workpiece W is mounted on the supporting block (not shown) on work table 19 with one end of the workpiece engaged with driving pin 36, a tail stock advance button (not shown) on the control panel 81 is depressed to advance ram 27 in the tail stock 21 by means of a hydraulic driving mechanism (not shown) whereby the tail stock center 28 is caused to engage the center hole of the workpiece W to move it in the axial direction thus supporting the workpiece W between centers 26 and 28. As the ram 27 reaches its extreme forward position, the switch valve 116 is operated to supply pressurized oil into cylinder 30 to drive feed screw 29 via the rack-pinion mechanism 32 and 33. Thus, the sleeve 25 is moved to urge the workpiece W against the force of ram 27. The axial movement of the workpiece W causes its flange W1 to engage and displace the measuring probe 38 of the end surface measuring device 37. When the probe 38 is displaced a definite quantity, the above described electric contact (not shown) is closed to switch the switch valve 116 whereby the supply and exhaust of the pressurized oil to and from cylinder 30 are stopped thus positioning the workpiece W at a definite axial position with respect to work table 19.

When the workpiece W is positioned at the predetermined position, tape reader 75 is started by a signal from the main control circuit 79. The first tape command signal indexes work table 19 and the quantity of the movement thereof is preset in numerical valve register 78. Thus, pulses are supplied to the electro-hydraulic pulse motor 24 to move work table 19 under the control of the operation circuit 80 which compares the number of pulses supplied with the command value preset in the numerical register 78. When the difference between these values becomes zero, a coincidence signal is provided which is used to stop table 19 at the definite position. This operation brings the first cylindrical portion W3 of the workpiece W in front of the grinding wheel 18 which is designed for grinding cylindrical portions. Then, the second tape command is read out to preset the finished dimension of the first cylindrical portion W3 in the numerical register 78 with the result that pulses are supplied to electric pulse motor 65 to adjust the operating point of the definite dimension measuring mechanism 55. Then the third tape command is read out to store the advance feed quantity of the grinding wheel carriage 6 in numerical data register 78. Concurrently therewith, rapid feed of the grinding wheel carriage 6 is commanded to apply pulses of high frequency to electro-hydraulic pulse motor 12 to advance the grinding wheel carriage 6 at a high speed. The number of pulses applied to the electro-hydraulic pulse motor 12 is compared with the commanded value by the operation circuit 80 and the coincidence signal therefrom causes the main control circuit 79 to perform switching operation. The switching signal from the main control circuit 79 controls the output control circuit 82 to supply the pressurized oil to an oil pressure driving mechanism (not shown) to rotate feed screw 108 a predetermined number of turns through rack-pinion mechanism 110 and ratchet mechanism 112 whereby the slide block 104 and grinding wheel carriage 6 are advanced a definite quantity toward the first cylindrical portion W3 of the workpiece W. As the grinding wheel carriage 6 is fed the definite quantity in this manner, the fourth tape command is read out to preset the quantity of movement of work table 19 in the numerical value register 78. At the same time, the traverse of work table 19 is commanded. Thus, pulses are applied to the electro-hydraulic pulse motor 24 to traverse work table 19. The number of pulses applied to pulse motor 24 is compared with the commanded value in the operation circuit 80. A coincidance signal from operation circuit 80 stops work table 19. Then the fifth tape command is read out to cause work table 19 to traverse the same quantity but in the opposite direction. Thereafter, in the same manner as above described, slide block 104 and grinding wheel carriage 6 are fed by a definite quantity toward the workpiece W, and then work table 19 is traversed. In this manner, the first cylindrical portion W3 is ground by the intermittent feeding operations of the grinding wheel carriage 6 and the transverse movement of work table 19. During this grinding operation dimension measuring mechanism 55 is advanced by a command from the main control circuit 79 to measure the diameter of the first cylindrical portion W3. When the diameter of the first cylindrical portion is reduced to the preset value a definite dimension signal is generated by the measuring mechanism 55 to stop table 19 at the end of its traverse movement. When the first cylindrical portion W3 has been worked to the desired diameter in this manner, the sixth tape command in read out to preset the quantity of axial movement of table 19 in the register 79 and to command the feeding operation of table 19. Consequently, electric pulses are supplied to electric-hydraulic pulse motor 24 and the number of the pulses is compared with the commanded value in the operation circuit 80. During this time, the end surface of flange W1 of the workpiece W is ground by grinding wheel 18 with the square peripheral edge. When the difference between values which are compared in the operation circuit 80 becomes zero, work table 19 is stopped and the grinding wheel carriage 6 is retracted rapidly. As the carriage 6 reaches the extreme retracted point the seventh tape command is read out to generate a table indexing command signal to preset the quantity of movement of work table 19 in the numerical value register 78. As a result, in the same manner as above described, pulses are applied to the electro-hydraulic pulse motor 24 to index work table 19 to a position wherein the second cylindrical portion W4 comes to oppose grinding wheel 18. By the control similar to that described above the second cylindrical portion W4 is ground to the commanded diameter. In the same manner, the third cylindrical portion W5 is worked to dimensions. It will be clear that when these second and third cylindrical portions W4 and W5 are worked, the operating points of the measuring mechanism 55 are charged according to commanded dimensions.

Since, in this embodiment, respective cylindrical portions W3, W4 and W5 are worked by the transverse grinding operations the grinding wheel carriage 6 has been shown as the double slide type and the carriage 6 is as being advanced by intermittent feeds caused by rack-pinion mechanism 110 and ratchet mechanism 112, where the cylindrical portions are worked by the plange cut grinding operations it is possible to perform such operations by a series of operations including the rapid advance, rough grinding feed, fine grinding feed and rapid return of the grinding wheel carriage 6 in accordance with the frequency of the pulses applied to the electro-hydraulic pulse motor 12. In the traverse cutting operation, it is also possible to provide intermittent feedings by the operation of the electro-hydraulic pulse motor 12.

When the third cylindrical portion W5 has been ground to the prescribed diameter and the grinding wheel carriage 6 has been rapidly retracted to the extremely retracted position, a next tape command is read out to command another table indexing operation thus presetting the quantity of movement of work table 19 in register 78. Accordingly, pulses are applied to electro-hydraulic pulse motor 24 to index table 19 to a position where the tapered portion W2 of the workpiece W comes to oppose grinding wheel 17 particularly designed for this purpose. When table 19 is indexed in this manner a command signal is provided to rapidly feed the carriage 5 supporting grinding wheel 17 for grinding the tapered portion, and the quantity of the movement of the carriage 5 is preset in the register 78, whereby pulses of a high frequency are applied to the electro-hydraulic pulse motor 11 to rapidly advance grinding wheel carriage 5. The number of pulses applied to electro-hydraulic pulse motor 11 is compared with the commanded value in the operation circuit 80. When the difference between thus values becomes zero a coincidence signal is produced to give an order to cause the main control circuit 79 to switch. This signal controls a hydraulic driving mechanism (not shown) to rotate feed screw 107 a predetermined number of turns through rack-pinion mechanism 109 and a ratchet mechanism 111. Consequently, the grinding wheel carriage 5 is moved by the prescribed quantity together with sliding block 103. When the grinding wheel carriage 5 is fed by the prescribed quantity a next tape command is read out to preset the quantities of movements of the grinding wheel carriage 5 and of work table 19 in register 78 while at the same time the slow speed advance of the grinding wheel carriage 5 and the traverse operation of work table 19 are commanded. is Thus, pulses are simultaneously supplied to the electro-hydraulic pulse motors 11 and 24 to concurrently commence movements of the grinding wheel carriage 5 and work table 19. The number of pulses supplied to these motors are compared with the commanded value in the operation circuit 80. The frequencies of the pulses supplied to the electro-hydraulic pulse motors 11 and 24 in order to control the movements of the grinding wheel carriage 5 and work table 19 have a definite ratio determined by the slope of the tapered portion W2 to be ground. In this manner, the tapered portion W2 is worked as desired by the concurrent control of the movements of the grinding wheel carriage 5 and the work table 19 along two axes perpendicular with each other. When the difference between two values which are to be compared in the operation circuit 80 becomes zero a coincidence signal is produced to read the next tape command whereby the grinding wheel carriage 5 is rapidly retracted by an amount equal to the slow forward movement thus also traverseing work table 19 and returning the grinding wheel carriage 5 and work table 19 to their original positions before commencement of the taper grinding operation. Under these conditions the above described oil pressure driving mechanism is controlled again to feed the grinding wheel carriage 5 over a definite quantity through rack-pinion mechanism 109 and ratchet mechanism 111. Thereafter, a next tape command is read out to respectively advance and traverse the grinding wheel carriage 5 and work table 19 at the same speed and by the same quantity as above described, thus grinding the tapered portion W2 according to the feed quantity imparted by the hydraulic driving mechanism. In this manner, the tapered portion W2 is worked by the concurrent feeding operation of the grinding wheel carriage 5 and work table 19. During this taper grinding operation the measuring mechanism 39 for measuring the dimension of the tapered portion is advanced to the working position by a command signal from the main control circuit 79. When the tapered portion W2 is ground to the given configuration and dimension a definite dimension signal is given which cooperates with a signal confirming that the grinding wheel carriage 5 and work table 19 have moved to their extreme ends to rapidly retract the carriage 5. When the carriage 5 reaches the retracted position the table 19 is traversed to its original position where the workpiece was firstly mounted between centers and then the table 19 stopped at that position.

As above described, according to this invention there are provided two independent grinding wheel carriages rotatably supporting a grinding wheel for working the cylindrical portion and a grinding wheel for working the tapered portion, respectively, and the grinding machine is constructed such that the tapered portion is worked by the simultaneous control of one of the grinding wheel and the work table for supporting the workpiece. For this reason, different from the prior art machine it is quite unnecessary to swing the work table or the grinding wheel carriage for grinding the tapered portion thus providing a novel digitally controlled grinding machine capable of working efficiently and with high accuracies.

It will be clear that the invention is not limited to the illustrated embodiment and that many changes and modifications may be made without departing from the spirit and scope of the invention.

Thus, for example, the electro-hydraulic pulse motor may be any well known servo-motor responsive to a digital command signal.

What is claimed is

1. In a digitally controlled grinding machine for grinding a workpiece including at least one cylindrical portion and at least one tapered portion, said grinding machine comprising a slidable work table for movement in one direction, table feed means, and means to support said workpiece on said table, the improvement which comprises a first grinding wheel carriage for supporting a first grinding wheel adapted to work said cylindrical portion, first feed means to move said first grinding wheel carriage in a direction perpendicular to said one direction, a second grinding wheel adapted to work said tapered portion, a second grinding wheel carriage supporting said second grinding wheel and, second feed means to move said second grinding wheel carriage in the same direction as said first grinding wheel carriage, a plurality of servo-motors responsive to command signals for respectively operating said table feed means and said feed means for said first and second grinding wheel carriages, and a digital control system for said servo-motors including a memory for storing informations regarding workings of said cylindrical and tapered portions of said workpiece and a control circuit responsive to said informations to operate said feed means of said first grinding wheel carriage for working said cylindrical portion and to simultaneously operate, at a definite speed ratio, said table feed means and said second feed means for said second grinding wheel carriage for working said tapered portion.

2. A digitally controlled grinding machine for grinding a workpiece including at least one cylindrical portion and at least one tapered portion, said grinding machine comprising a bed, a work table guided to slide in one direction on said bed, table feed means to move said table, means mounted on said table to support said workpiece, a driving device to rotate said workpiece, a first grinding wheel carriage guided to slide in a direction perpendicular to said one direction on said bed, a first grinding wheel mounted on said carriage and adapted to work said cylindrical portion, a first, said first grinding wheel having a square peripheral edge, feed means to move said first grinding wheel carriage on said bed, a second grinding wheel having a round peripheral edge and adapted to work said tapered portion, a second grinding wheel carriage supporting said second grinding wheel and guided to slide on said bed in the same direction as said first grinding wheel carriage, a second feed means to move said second grinding wheel carriage, a plurality of servo-motors responsive to digital command signals for respectively operating said table feed means and said feed means for said first and second grinding wheel carriages; and a digital control system for said servo-motors including an input tape storing a first information for working said cylindrical portion and a second information for working said tapered portion, means to read said informations, means responsive to said first information to operate said first feed means for said first grinding wheel carriage and means responsive to said second information to simultaneously operate, at a definite speed ratio, said table feed means and said second feed means for said second grinding wheel carriage.

3. A digitally controlled grinding machine according to claim 1 which further includes measuring mechanisms for measuring definite diameters of said cylindrical portion and said tapered portion.

4. A digitally controlled grinding machine according to claim 3 wherein means is provided to move said measuring mechanisms between operative and inoperative positions.

5. A digitally controlled grinding machine according to claim 2 which further comprises means for moving said workpiece with respect to said work table, means for positioning said workpiece with respect to said work table and including a measuring probe adapted to edge a reference surface on said workpiece, and measuring mechanisms for measuring definite diameters of said cylindrical portion and said tapered portion.

6. A digitally controlled grinding machine according to claim 5, wherein said measuring mechanism for said tapered portion of the workpiece comprises a measuring base secured on said work table, a supporting block connected to said measuring base for movement toward and away from said tapered portion of the workpiece, an arm pivotally mounted on said supporting block for pivotal movement in a horizontal plane, a pair of probes adjustably secured to said arm, resilient means for rotating said pair of probes to be engaged with said tapered portion of the workpiece, and means for detecting the displacement of said probes.

7. A digitally controlling grinding machine according to claim 5, wherein said measuring mechanism for said cylindrical portion of the workpiece comprises a cross-bar movably mounted on said bed, a measuring head pivotally mounted on said cross-bar, an electric motor mounted on said measuring head, a feed screw means adapted to be rotated by said motor, a pair of probes arranged to engage said cylindrical portion of the workpiece, and means for measuring the distance between said probes.

* * * * *